United States Patent Office 2,734,878
Patented Feb. 14, 1956

2,734,878

OIL-SOLUBLE PHENOLIC RESINS AND AIR-DRYING VARNISHES PREPARED THEREFROM

Sydney Robbins and Robert H. Runk, Pittsburgh, Pa., assignors to Westinghouse Electric Corporation, East Pittsburgh, Pa., a corporation of Pennsylvania No Drawing. Application July 23, 1952,
Serial No. 300,529

9 Claims. (Cl. 260—19)

This invention relates to the preparation of oil-soluble phenolic resins and air-drying varnishes therefrom.

In order to secure the optimum combination of properties in an air-drying varnish derived by heat-bodying phenolic resins and drying oils, the industry has found it necessary to blend two different phenolic resins and body the blend with the drying oil. Each of the different phenolic resins used in the blend must be held to rather close specifications, and they must be combined in accurate proportions to secure the desired end result. It has entailed considerable care and effort to produce consistently good varnishes in view of all of these variables.

It is regarded as highly desirable that air-drying spar varnishes, primer vehicles and varnishes for use in making the coatings on electrical tapes have the following characteristics:

1. An air-drying time of the order of one hour at room temperature—as determined by the procedure set forth in ASTM specification D115–48T. An air-drying time of from 30 minutes to 2 hours at 25° C. is satisfactory 2. A gel time of from four to seven hours at 190° C. for a composition comprising one part by weight of the phenolic resins and one part by weight of tung oil.

3. A kettling or heat-bodying time of less than one hour at about 235° C. for a varnish produced from 100 pounds by weight of the phenolic resin and 12½ gallons of tung oil to produce a heat-bodied varnish which when dissolved in xylene to a 50% solid solution will have a viscosity of from J to L on the Gardner-Holdt scale.

4. Good color.

5. Solubility in aliphatic solvents.

6. A heat endurance of 72 hours at 110° C. as determined by ASTM specification D115–48T.

To the best of our knowledge and belief, no single phenolic resin has been available that could be heat-bodied with a drying oil to produce a varnish having an oil length of from ten to thirty gallons that would meet all of the above requirements.

The object of the present invention is to provide an oil-soluble phenolic resin that may be heat-bodied with a drying oil to produce an air-drying varnish having the optimum characteristics desired in the industry.

A further object of the invention is to provide a process for producing a single phenolic resin that may be heat-bodied with a drying oil in less than one hour to produce an air-drying varnish with the optimum characteristics.

A still further object of the invention is to provide an air-drying varnish having optimum characteristics that may be secured consistently.

We have discovered that oil-soluble phenolic resins that may be heat-bodied to produce air-drying varnishes possessing all of the six characteristics above set forth may be prepared by reacting in the presence of substantial amounts of water (1) a mixture of phenols composed of from 7 to 20 mol per cent of diphenylolpropane and from 93 to 80 mol per cent of butyl phenol, preferably paratertiarybutyl phenol, and (2) from 1.65 to 2.10 mols of formaldehyde per mol of the phenols, and (3) from ½% to 3%, based on the weight of the phenols, of oxalic acid or ⅒ this amount of sulphuric acid or mixtures thereof, as a catalyst. The oxalic acid may be replaced in part by sulphuric acid in an amount such that on the basis of 96% sulphuric acid, the weight thereof equals ⅒ the weight of the oxalic acid replaced. The formaldehyde is preferably 37 to 40% aqueous formaldehyde, which thereby provides the water necessary for carrying out the reaction. However, paraformaldehyde or other polyoxymethylene compounds from which formaldehyde is derived may be employed. The amount of water should be equal to at least 10% of the weight of the reaction mixture. The oxalic acid may be added either as the anhydrous acid or as the dihydrate, the weight being calculated on the basis of oxalic acid in the anhydrous form.

In carrying out the reaction, the mixture of phenols, formaldehyde, and catalyst is refluxed for at least fifteen minutes until substantially all of the phenols and formaldehyde have reacted together to form the initial reaction product. The refluxing may be carried out for a longer period of time of one hour or more. We have found that, in general, forty-five minutes to 1 hour with 1% oxalic acid is an adequate reflux time. Thereafter, the reaction mixture is subjected to dehydration under vacuum to remove substantially all the water therefrom. The temperature of the reaction mixture is increased during said dehydration but should not exceed substantially 80° C. for any appreciable length of time. We prefer to maintain the temperature during the dehydration period so that it just reaches 75° C. The applied vacuum should reach a value of at least 5 inches of mercury absolute pressure. Usually, there will be no difficulty in attaining a vacuum of 2 to 3 inches of mercury absolute pressure in commercial reaction vessels. This vacuum and temperature will cause substantially all of the water to be removed from the reaction product.

The vacuum is then broken and atmospheric pressure is then restored to the reaction vessel, and the dehydrated resinous reaction product is heated to an elevated temperature of from 140° C. to 170° C. until the resinous reaction product exhibits a ball and ring temperature of from 135° C. to 160° C. In order to complete this stage of the reaction promptly, it is desirable to heat the resinous reaction product rapidly, after breaking the vacuum, to a temperature of from 150° C. to 170° C. inasmuch as heating at these temperatures will complete the reaction in from fifteen to forty-five minutes.

The phenolic resin having a ball and ring value of from 135° C. to 160 C. is oil-soluble and may be immediately combined and heat-bodied in the reaction vessel with a suitable drying oil. Alternatively, the phenolic resin may be poured into pans and cooled to room temperature whereupon its solidifies. The solid resin may be then broken up and crushed into a powder and stored for later addition to a drying oil to be kettled so as to prepare varnishes therefrom.

We have found it to be critical that the diphenylolpropane should comprise between 7 and 20 mol per cent of the total mols of the phenols. Thus, we have prepared a series of resins otherwise identical except that the diphenylolpropane constituted 10, 14, 20, and zero mol per cent, respectively, of the total content of phenols, the other phenol being paratertiarybutyl phenol. In each case, the formaldehyde-to-phenol ratio was 1.88. In each case, 1% of oxalic acid dihydrate, based on the total weight of the phenols, was employed. The resins are all refluxed for forty-five minutes and then vacuum dehydrated at a temperature of not exceeding 75° C. under the same vacuum condition. Atmospheric pressure was then restored, and the compositions were all heated at 160° C. The composition with 10% diphenylolpropane reached a ball and ring value of 155° C. in fifteen minutes. The composition with 14 mol per cent of diphenylolpropane required only five minutes at 160° C. to reach a ball and ring value of 138° C. The composition with 20 mol per cent of diphenylolpropane required only five minutes at 160° C. to reach a ball and ring value of 142° C. With no diphenylolpropane, the product after one hour at 160° C. had a ball and ring value of 136° C. However, this last resin had a gel time of 10½ hours when compounded with an equal part by weight of tung oil and heated to 190° C. The first mentioned three resins had gel times of six hours, 5¾ hours, and five hours, respectively, under the same conditions. Consequently, the resin with no diphenylolpropane was not satisfactory.

Our experience has been that compositions prepared with substantially more than 20 mol per cent of diphenylolpropane are so heat-reactive that the processing after vacuum dehydration is not controllable. The resin will solidify and form a crust, and the kettle stirrer will not function satisfactorily. The resin will be non-uniform in quality and it is not feasible to react it to the desired ball and ring temperature. The resin will rapidly react to a ball and ring temperature of over 160° C. and no satisfactory varnish can be made therefrom.

We have found that compositions having a formaldehyde-to-phenol ratio of 1.85 to 1.95 produce the best resins. However, all compositions within the range of 1.65 to 2.10 mols of formaldehyde to phenol resulted in acceptable phenolic resins. Where the ratio of formaldehyde to phenol exceeds 2.0, care should be exercised during vacuum dehydration to avoid excessive foaming.

The vacuum dehydration step has been found to be critical in that the temperature of the resins should not exceed 80° C. when oxalic acid is used as a catalyst. We have carried out a number of reactions at which the temperature during evacuation was from 100° C. to 110° C. and higher, and in each instance, the resulting resin was considerably less reactive and was of such inferior properties that an acceptable varnish was not secured therewith.

In order to prepare an air-drying varnish from the phenolic resin described herein, there are employed glycerides of unsaturated drying oil fatty acids having at least two ethylenically unsaturated groups. Examples of such glycerides are tung oil, bodied linseed oil, oiticica oil and maleinized linseed oil which latter comprises the glyceryl ester of the adduct of maleic anhydride and linseed oil. It will be understood that other drying oils or mixtures of two or more drying oils may be employed if desired.

We have found that the preparation of an air-drying varnish is most economically and rapidly prepared by simply adding the required amount of the oil to the hot phenolic resin which has the ball and ring value of from 135° C. to 160° C. while it is still in the reaction kettle and heat-bodying the mixture at a temperature of from 220° C. to 250° C. for a period of not in excess of one hour until the heat-bodied product when dissolved in xylene to form a 50% solution has a viscosity of from J to L on the Gardner-Holdt scale. Of course, conventional varnish-making practice may be followed, namely, crushed phenolic resin may be added to the hot oil and bodied in a varnish kettle to the same viscosity.

The following examples illustrate the practice of the invention:

*Example I*

Into a closed reaction vessel provided with a reflux column, stirrers, and the usual attachments for reacting phenolic resins, there was introduced the following:

Diphenylolpropane _____ 1 mol.
Paratertiarbutyl phenol _____ 9 mols.
Formaldehyde (37% aqueous solution) __ 18.8 mols.
Oxalic acid dihydrate _____ 1% of weight of phenols.

The formaldehyde to phenol ratio was 1.88. The reaction vessel was heated until reflux started and continued for forty-five minutes. A vacuum was applied to withdraw water over a period of time of forty minutes, the temperature dropping initially and then increasing as external heat was supplied until the temperature reached 77° C. Vacuum was broken at this point, and the composition was then stirred and heated rapidly until a temperature of 160° C. was attained. In fifteen minutes after the temperature reached 160° C., the phenolic resin had a ball and ring value of 155° C. There was immediately introduced 12½ gallons of tung oil for every hundred pounds of the phenolic resin in the reaction vessel, and the mixture was then heat-bodied at 235° C. for twenty-five minutes. The resulting varnish when dissolved in xylene to produce a 50% solid solution had a Gardner-Holdt viscosity of J. Films of the varnish when applied to surfaces dried in 1¼ hours to a print-free condition.

*Example II*

Another resin was prepared in accordance with the procedure of Example I, employing, however, a formaldehyde-to-phenol ratio of 1.8, the reaction conditions being otherwise identical. The ball and ring value of the phenolic resin so produced was 135° C. A varnish prepared under similar conditions as that of Example I in approximately thirty minutes kettling time had an air-drying time of 1¾ hours.

*Example III*

The procedure of Example I was followed, using, however, 1.2 mols of diphenylolpropane, 8.8 mols of paratertiarybutyl phenol, and 20.2 mols of 37% aqueous formaldehyde admixed therewith. After refluxing and dehydrating to 75° C., the resin was heated to 160° C. and at the end of fifteen minutes, the phenolic resin had a ball and ring temperature of 147° C. The gel time of this resin, when admixed with an equal part by weight of tung oil, was 5½ hours at 190° C., whereas the gel time of the resin of Example I was six hours under the same conditions, and the gel time of the resin of Example II was 6¾ hours. The air-drying time of the varnish of this Example III was 1.5 hours.

*Example IV*

A phenolic resin was prepared from 2 mols of diphenylolpropane, 8 mols of paratertiarybutyl phenol and 18.8 mols of 37% aqueous formaldehyde. The procedure of Example I was followed, the resin reacting to a ball and ring temperature of 142° C. after 5 minutes at 160° C. after vacuum dehydration. A 12.5 gallon oil length varnish was prepared from this phenolic resin with tung oil by kettling for 15 minutes at 235° C. The resulting varnish air dried in 45 minutes to a print-free film.

*Example V*

Into a reaction vessel there was charged a mixture comprising 7 mol per cent of diphenylolpropane and 93 mol per cent of paratertiarybutyl phenol, and sufficient 37% aqueous formaldehyde to provide 1.65 mols of formaldehyde per mol of the phenols. Sulphuric acid was added to introduce 0.1% $H_2SO_4$, based on the weight of the phenols, to catalyze the reaction. After refluxing for forty minutes, a vacuum of 27 inches of mercury was applied for about forty-five minutes, heat being applied to the vessel to increase the temperature to 75° C. The vacuum was broken when this temperature was reached and heating continued until the charge reached a temperature of 160° C. After fifteen minutes at 160° C., the ball and ring value of the resin was 148° C. and its gel time was 6.25 hours. When a 12½ gallon tung oil length varnish was made from this phenolic resin, its air drying time was one hour.

Other phenolic resins were prepared, using sulphuric acid alone and in combination with oxalic acid. Resin compositions comparable with those of the previous examples were attained by using 0.5% by weight of the oxalic acid dihydrate and 0.05% of 96% sulphuric acid in lieu of the all-oxalic acid catalyst in these examples.

All of the varnishes of these examples were easily dissolved in aliphatic solvents such as petroleum hydrocarbon fractions containing decanes and higher aliphatic hydrocarbons. Likewise, in every case, the varnish had a good color. They were well-suited for use as spar varnishes and floor varnishes. They could be combined with other ingredients to form excellent primers. When applied to cotton tape, they will produce varnished electrical tapes meeting standard requirements. The heat endurance of these compositions in each case exceeded 175 hours at 110° C. In all cases, these varnishes exhibited good resistance to caustics.

It is intended that all the matter contained in the above description be considered as illustrative and not limiting.

We claim as our invention:

1. An air-drying varnish comprising as the essential resinous ingredients thereof the product derived by heat-bodying at a temperature of from 220° C. to 250° C. for a period of not in excess of an hour a mixture of (a) from 10 to 30 gallons of a glyceride of an unsaturated drying oil fatty acid having at least two ethylenically unsaturated groups and (b) 100 pounds of a phenolic resin derived by heating in the presence of substantial amounts of water comprising at least 10% of the weight of the reaction mixture a mixture of phenols composed of from 7 to 20 mol per cent of diphenylolpropane, and from 93 to 80 mol per cent of butyl phenol, and from 1.65 to 2.10 mols of formaldehyde per mol of the phenols, and from ½% to 3%, based on the weight of the phenols, of oxalic acid as a catalyst, the mixture of phenols, formaldehyde and oxalic acid being refluxed for at least 15 minutes until substantially all the phenols and formaldehyde have reacted together, then dehydrating the reaction mixture under vacuum to remove substantially all the water therefrom, the temperature of the reaction mixture during said dehydration not exceeding 80° C., restoring atmospheric pressure and heating the dehydrated resin to an elevated temperature of from 140° C. to 170° C. until the resinous reaction product has a ball and ring temperature of from 135° C. to 160° C., the mixture of (a) and (b) being heat-bodied until a 50% solution in xylene has a viscosity of from J to L on the Gardner-Holdt scale, films of the heat-bodied varnish air drying in the order of one hour at room temperature.

2. The varnish of claim 1 wherein the butyl phenol comprises paratertiarybutyl phenol.

3. The varnish of claim 1 wherein the glyceride of the unsaturated acid is tung oil.

4. The varnish of claim 1 wherein sulphuric acid is substituted for at least a part of the oxalic acid in an amount providing a weight of 96% sulphuric acid equal to 10% of the weight of the oxalic acid so replaced.

5. In the process of preparing an air-drying varnish, the steps comprising heating for a period of not in excess of one hour at a temperature of from 220° C. to 250° C. a mixture of (a) from 10 to 30 gallons of a glyceride of an unsaturated drying oil fatty acid having at least two ethylenically unsaturated groups and (b) 100 pounds of a phenolic resin derived by heating in the presence of substantial amounts of water comprising at least 10% of the weight of the reaction mixture a mixture of phenols composed of from 7 to 20 mol per cent of diphenylolpropane, and from 93 to 80 mol per cent of butyl phenol, and from 1.65 to 2.10 mols of formaldehyde per mol of the phenols, and from ½% to 3%, based on the weight of the phenols, of oxalic acid as a catalyst, the mixture of phenols, formaldehyde and oxalic acid being refluxed for at least 15 minutes until substantially all the phenols and formaldehyde have reacted together, then dehydrating the reaction mixture under vacuum to remove substantially all the water therefrom, the temperature of the reaction mixture during said dehydration not exceeding 80° C., restoring atmospheric pressure and heating the dehydrated resin to an elevated temperature of from 140° C. to 170° C. until the resinous reaction product has a ball and ring temperature of from 135° C. to 160° C., the mixture of (a) and (b) being heat-bodied until a 50% solution in xylene has a viscosity of from J to L on the Gardner-Holdt scale, films of the heat-bodied varnish air drying in the order of one hour at room temperature.

6. In the process of preparing a phenolic resin, the steps comprising heating in the presence of substantial amounts of water a mixture of phenols composed of from 7 to 20 mol per cent of diphenylolpropane, and from 93 to 80 mol per cent of butyl phenol, and from 1.65 to 2.10 mols of 37% to 40% aqueous formaldehyde per mol of the phenols, and from ½% to 3%, based on the weight of the phenols, of oxalic acid as a catalyst, the mixture of phenols, formaldehyde and oxalic acid being refluxed for at least 15 minutes until substantially all the phenols and formaldehyde have reacted together, then dehydrating the reaction mixture under vacuum to remove substantially all the water therefrom, the temperature of the reaction mixture during said dehydration not exceeding 80° C., restoring atmospheric pressure and heating the dehydrated resin to an elevated temperature of from 140° C. to 170° C. until the resinous reaction product has a ball and ring temperature of from 135° C. to 160° C.

7. The process of claim 6 wherein sulphuric acid replaces at least a part of the oxalic acid in an amount providing a weight of 96% sulphuric acid equal to 0.1 of the weight of the oxalic acid so replaced.

8. Potentially reactive, heat-hardenable solid phenolic resin derived by heating in the presence of substantial amounts of water a mixture of phenols composed of from 7 to 20 mol per cent of diphenylolpropane, and from 93 to 80 mol per cent of butyl phenol, and from 1.65 to 2.10 mols of 37% to 40% aqueous formaldehyde per mol of the phenols, and from ½% to 3%, based on the weight of the phenols, of oxalic acid as a catalyst, the mixture of phenols, formaldehyde and oxalic acid being refluxed for at least 15 minutes until substantially all the phenols and formaldehyde have reacted together, then dehydrating the reaction mixture under vacuum to remove substantially all the water therefrom, the temperature of the reaction mixture during said dehydration not exceeding 80° C., restoring atmospheric pressure and heating the dehydrated resin to an elevated temperature of from 140° C. to 170° C. until the resinous reaction product has a ball and ring temperature of from 135° C. to 160° C., the resulting phenolic resin on being cooled to room temperature being a solid.

9. The phenolic resin of claim 8 wherein in the process for its preparation sulphuric acid replaces at least a part of the oxalic acid in an amount providing a weight of 96% sulphuric acid equal to 0.1 of the weight of the oxalic acid so replaced.

References Cited in the file of this patent

UNITED STATES PATENTS 2,586,385   Runk _____ Feb. 19, 1952